(12) United States Patent
Liu

(10) Patent No.: US 8,457,252 B2
(45) Date of Patent: Jun. 4, 2013

(54) METHOD AND APPARATUS FOR DIGITAL SIGNAL RECEPTION

(75) Inventor: Peng Liu, Beijing (CN)

(73) Assignee: Thomson Licensing (FR)

( * ) Notice: Subject to any disclaimer, the term of this patent is extended or adjusted under 35 U.S.C. 154(b) by 764 days.

(21) Appl. No.: 12/450,685

(22) PCT Filed: Apr. 4, 2007

(86) PCT No.: PCT/CN2007/001106
§ 371 (c)(1),
(2), (4) Date: Jan. 29, 2010

(87) PCT Pub. No.: WO2008/122144
PCT Pub. Date: Oct. 16, 2008

(65) Prior Publication Data
US 2010/0150283 A1    Jun. 17, 2010

(51) Int. Cl.
*H04L 27/00*    (2006.01)
*H03K 9/00*    (2006.01)

(52) U.S. Cl.
USPC .......................... 375/316; 375/260; 375/267

(58) Field of Classification Search
USPC ......................................... 375/260, 267, 316
See application file for complete search history.

(56) References Cited

U.S. PATENT DOCUMENTS

| 6,862,262 B1 * | 3/2005 | Imamura | 370/210 |
| 7,020,222 B2 * | 3/2006 | Magee | 375/340 |
| 7,170,961 B2 * | 1/2007 | Vandenameele-Lepla | 375/371 |
| 2006/0182015 A1 | 8/2006 | Kim | |
| 2007/0025461 A1 | 2/2007 | Park et al. | |
| 2007/0086533 A1 * | 4/2007 | Lindh | 375/260 |
| 2007/0189402 A1 * | 8/2007 | Yang | 375/260 |
| 2007/0253497 A1 * | 11/2007 | Chen | 375/260 |
| 2008/0008258 A1 * | 1/2008 | Tanabe | 375/267 |
| 2008/0267273 A1 * | 10/2008 | Aue | 375/224 |

FOREIGN PATENT DOCUMENTS

KR    2006/0071084    6/2006

OTHER PUBLICATIONS

Search Report Dated Jan. 3, 2008.

* cited by examiner

*Primary Examiner* — Chieh M Fan
*Assistant Examiner* — Freshteh N Aghdam
(74) *Attorney, Agent, or Firm* — Jack Schwartz and Associates, PLLC

(57) ABSTRACT

The present invention relates to a digital signal reception method and apparatus. Said digital signal receiver comprises a Common Phase Error removal unit for eliminating CPE contained in the received signal by using CSI corrected pilot sub-carriers; a channel estimation unit for estimating channel state information of the received signal after removing the CPE and feed the CSI to the CPE removal unit, and a means for generating the CSI corrected pilot sub-carriers by multiplying the CSI with 1 or −1 according to positive or negative sign of the local pilot sub-carriers only in response to continual pilots of the received signal. Said method comprises estimating the CSI of the received digital signal after removing CPE; and eliminating the CPE of the received signal by using the CSI corrected pilot sub-carriers, whereby a low complexity and high accuracy are achieved.

4 Claims, 8 Drawing Sheets

METHOD AND APPARATUS FOR DIGITAL SIGNAL RECEPTION

This application claims the benefit, under 35 U.S.C. §365 of International Application PCT/CN2007/001106, filed Apr. 4, 2007, which was published in accordance with PCT Article 21(2) on Oct. 16, 2008 in English.

FIELD OF THE INVENTION

The present invention relates to digital signal reception technology in digital video broadcasting system, and more particularly, to an OFDM (Orthogonal Frequency Division Multiplexing) digital signal reception apparatus and method for accurately removing common phase error (CPE) of received signal.

BACKGROUND OF THE INVENTION

In the field of television broadcasting, DTV (digital TV) system is a new generation of recent years, which is an all-digital system from REC to transmission, then to reception. DVB-T is one of the four kinds of DTV broadcasting standards in the world, and DVB-H is a standard for handheld application based on DVB-T standard. Both DVB-T and DVB-H are based on Orthogonal Frequency Division Multiplexing (OFDM). It has gained much attention and been put in use in about 100 countries. The recent researches on the relevant technologies have become very important for the great market value of DVB-T/H.

In practical communication system, modulator and demodulator usually work either at baseband or at an intermediate frequency (IF). As we have to transmit signal at some allocated radio frequency (RF), it follows that we have to up-convert the modulated signal to RF channel in the transmitter, and down-convert RF signal to IF or baseband in the receiver. To do this the practical local oscillators will be used, which bring phase noise (PHN) and interfere with the signal. Since the receivers are usually manufactured at low cost, PHN is considered more in the receiver end.

The phase noise is not a big problem for the conventional analog TV systems, but the significance of the problem increases very strongly with the introduction of OFDM. The main difference between the OFDM and other digital modulation types is that the OFDM signal consists of multiple low rate sub-carriers that are orthogonal with each other, therefore the OFDM systems are very sensitive to phase noise. The low symbol rate makes the synchronization even more difficult when fast phase disturbances occur, and the phase noise degrades orthogonality of the sub-carriers.

When PHN has been added to the OFDM signal at a DVB-T receiver, the received OFDM signal will suffer two effects: Common Phase Error (CPE), which is a rotation of the signal constellation, and also known as average phase noise offset affecting all the sub-channels equally, and Inter Carrier Interference (ICI), similar to additive Gaussian noise, which is caused by the loss of orthogonality of the sub-carriers and will interfere with demodulation of OFDM symbols. Therefore, PHN removal is very important for a practical OFDM system.

The Common Phase Error (CPE) can be removed in the receiver and the Inter Carrier Interference (ICI) effect only can be reduced. Because the information of pilots inserted in the OFDM symbol are known to the receiver, the CPE removal methods are based on pilots. FIG. 1 is a block diagram of partial configuration of a conventional OFDM signal receiver 100, which includes a demodulation module 110, a Fast Fourier Transform (FFT) module 120, a synchronization and timing (S&T) module 130, a Common Phase Error (CPE) removal module 140, a channel estimation (CE) module 150, and a channel decoding module 160. The demodulation module 110 demodulates a digital OFDM signal received to generate a complex signal including an in-phase signal and a quadrature-phase signal. The digital signal compensated by the synchronization and timing module 130 passes through the FFT module 120. Then the CPE removal module 140 estimates and corrects a Common Phase Error (CPE) contained in all sub-carriers of the OFDM digital signal. Afterwards the corrected digital signal is equalized in the channel estimation module 150, and then transmitted to the channel decoding module 160 for the decoding process.

There are mainly three types of conventional solutions for the CPE estimation, wherein the first one is a cross correlation method, the second one employs an auto-correlation method, and the third type of the conventional CPE estimation employs a two-steps method, as illustrated respectively through FIGS. 2A to 2C. The detailed algorithm of conventional CPE estimation method will be discussed in the following paragraph.

Assumed the useful length of an OFDM symbol is $T_u$, the number of sub-carriers is N, the guard interval (GI) is L, then the modulated symbol in time domain is:

$$x_i(n) = \sum_{k=0}^{N-1} X_i(k) e^{j\frac{2\pi}{N}kn} \quad n = -L, \ldots 0, 1, \ldots N-1 \quad (1)$$

The signal received in the receiver is:

$$y_i(n) = x_i(n) e^{j\phi_i(n)} \otimes h_i(n) + \mu_i(n) \quad (2)$$

Where $\phi_i(n)$ is the CPE, $h_i(n)$ is the channel response, $\mu_i(n)$ is the AWGN.

After FFT, the signal in frequency domain is:

$$Y_i(k) = X_i(k) e^{j\phi_i(k)} \cdot H_i(k) + \mu_i(k) \quad (3)$$

Then assumed the local pilot sub-carriers in receiver is $P_k (k=1, \ldots, K)$, K is the number of pilots used in a symbol. For the discussion convenience, we assume $|H_i(k)|=1$, which can simplify the analysis.

As shown in FIG. 2A, when the cross-correlation method is engaged in the first type of conventional CPE estimation, we can obtain:

$$\hat{\varphi} = \arg(P_k e^{j\varphi_i(k)} \cdot H_i(k) \cdot P_k^*) \quad (4)$$
$$= \varphi_i(k) + \arg(H_i(k))$$
$$= \varphi_i(k) + \varphi_H(k)$$

This method based on cross-correlation is the simplest. But it can not obtain good performance as it does not consider the channel effect. The CPE estimated results have a term of channel response. Under the multi-path channel or Doppler condition, the CPE estimation results will have great estimated errors since the channel response is not linearity.

In FIG. 2B, when the auto-correlation method is engaged, we can obtain:

$$\Delta\hat{\varphi} = \arg(P_k e^{j\varphi_i(k)} \cdot H_{i+1}(k) \cdot (P_k e^{j\varphi_{i-1}(k)} \cdot H_i(k))^*) \quad (5)$$
$$= \arg(P_k e^{j\varphi_i(k)} \cdot H_{i+1}(k) \cdot (P_k e^{j\varphi_{i-1}(k)} \cdot H_i(k))^*)$$
$$= \varphi_i(k) - \varphi_{i-1}(k)$$
$$\hat{\varphi} = \varphi_i(k) = \varphi_{i-1}(k) + \Delta\varphi \quad (6)$$

In this auto-correlation method, the difference of PHN of the neighbor symbol is estimated, so the PHN result can be obtained by sum of estimated result.

After CPE removal, we can obtain:

$$\hat{Y}_i(k) = Y_i(k) \cdot e^{-j\hat{\varphi}} \quad (7)$$
$$= X_i(k) e^{j\varphi_i(k)} \cdot H_i(k) \cdot e^{-j\hat{\varphi}} + \mu_i(k)$$
$$= X_i(k) \cdot H_i(k) + \mu_i(k)$$

After CE (channel estimation), we can obtain:

$$\hat{X}_i(k) = \hat{Y}_i(k) \cdot \hat{H}_i^*(k) \quad (8)$$
$$= (X_i(k) \cdot H_i(k) + \mu_i(k)) \cdot \hat{H}_i^*(k)$$
$$= X_i(k) \cdot e^{j(\varphi_H(k) - \hat{\varphi}_H(k))} + \mu_i(k)$$

The auto-correlation method can obtain better performance than the cross-correlation method. Since the channel effect can be almost eliminated by auto-correlation operation. But it has more implementation complexity than the cross-correlation method.

Because information obtained by CE has some difference with the real channel response, there will be some residual phase errors after CE. The methods before CE are called pre-CE methods, which have no benefit for phase error compensation after CE.

As illustrated in Fig.2C, the conventional two steps method is shown, which can resolve above mentioned problem. Besides of CPE removal before CE, the fine CPE removal after CE is engaged. The part before CE is the same as the auto-correlation method, and the fine CPE estimation is like to the cross-correlation method. The fine removal process after CE will be not affected by channel conditions and it can eliminate the residual phase error $\phi_H(k) - \hat{\phi}_H(k)$ in equation (8). So the two steps method is more accurate than the pre-CE methods. However, the main shortage of the method is that it has much higher complexity as it can be seen the twice CPE removal.

Therefore, it is desirable to develop an improved method for CPE removal of the OFDM signal reception, which overcomes drawbacks of the prior arts.

SUMMARY OF THE INVENTION

According to one aspect of the present invention, a digital signal receiver is provided. The digital signal receiver comprises a Common Phase Error (CPE) removal unit configured to eliminate common phase error of the received signal by using pilot sub-carriers that are corrected from local pilot sub-carriers with channel state information (CSI); and a channel estimation (CE) unit configured to estimate channel state information (CSI) of the received signal after removing common phase error (CPE) and feed the CSI back to the CPE removal unit, wherein the CPE removal unit comprises a means for generating the CSI corrected pilot sub-carriers by multiplying the CSI received from the CE unit with 1 or −1 according to positive or negative sign of the local pilot sub-carriers only in response to continual pilots of the received signal, a means for correlating extracted pilot sub-carriers of the received signal with the CSI corrected pilot sub-carriers, and a means for eliminating the CPE contained in the received signal by multiplying estimated phase angel of the correlation result with the received signal delayed by one symbol.

Advantageously, the digital signal receiver of the present invention introduces the CSI generated from the CE unit and generates a CSI-pilot which is used in the CPE compensation, and still uses a simple cross-correlation CPE removal module, so that the implementation of the invention is low in complexity, but with a high accuracy.

According to another aspect of the present invention, a digital signal reception method is provided, said method comprises estimating channel state information (CSI) of the digital signal received after removing Common Phase Error (CPE); and eliminating the CPE of the received signal by using pilot sub-carriers that are corrected from local pilot sub-carriers with the CSI generated in the previous step. It further comprises sub-steps of generating the CSI corrected pilot sub-carriers by multiplying the CSI with 1 or −1 according to positive or negative sign of the local pilot sub-carriers only in response to continual pilots of the received signal, correlating extracted pilot sub-carriers of the received signal with the CSI corrected pilot sub-carriers; and eliminating the CPE contained in the received signal by multiplying estimated phase angel of the correlation result with the received signal delayed by one symbol.

Advantageously, the digital signal reception method of the present invention uses the CSI-pilot in the CPE compensation while still uses a simple cross-correlation CPE removal module, which results in low complexity and high accuracy.

DETAILED DESCRIPTION OF PREFERRED EMBODIMENTS

Figure 1:
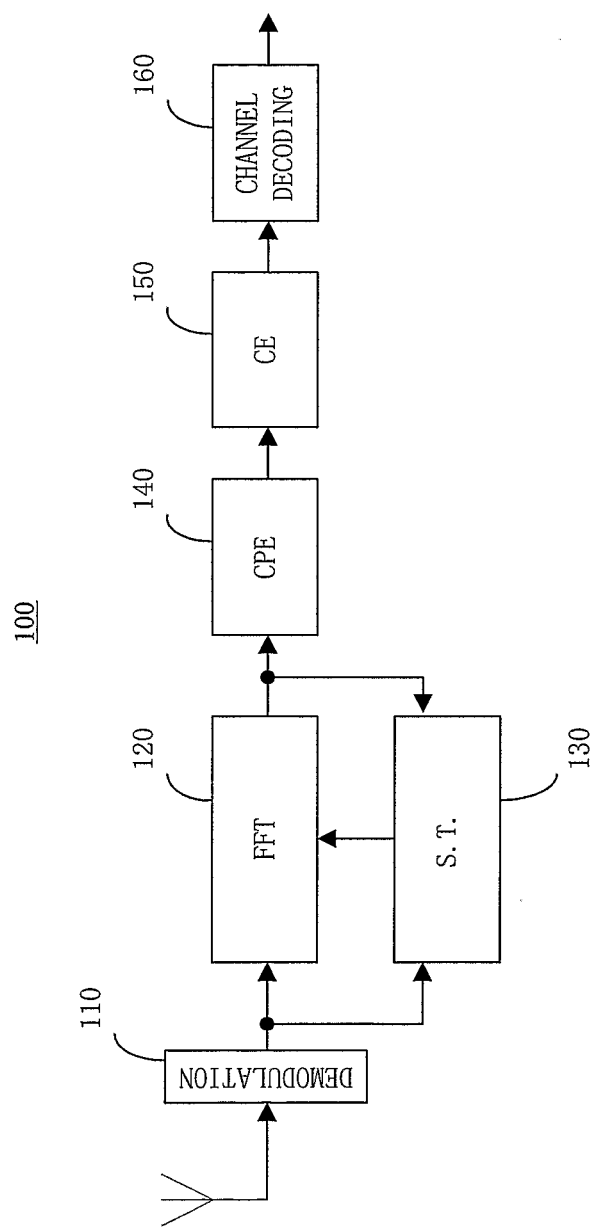
FIG. 1 is a block diagram of a conventional OFDM digital signal reception apparatus.
Figure 2:
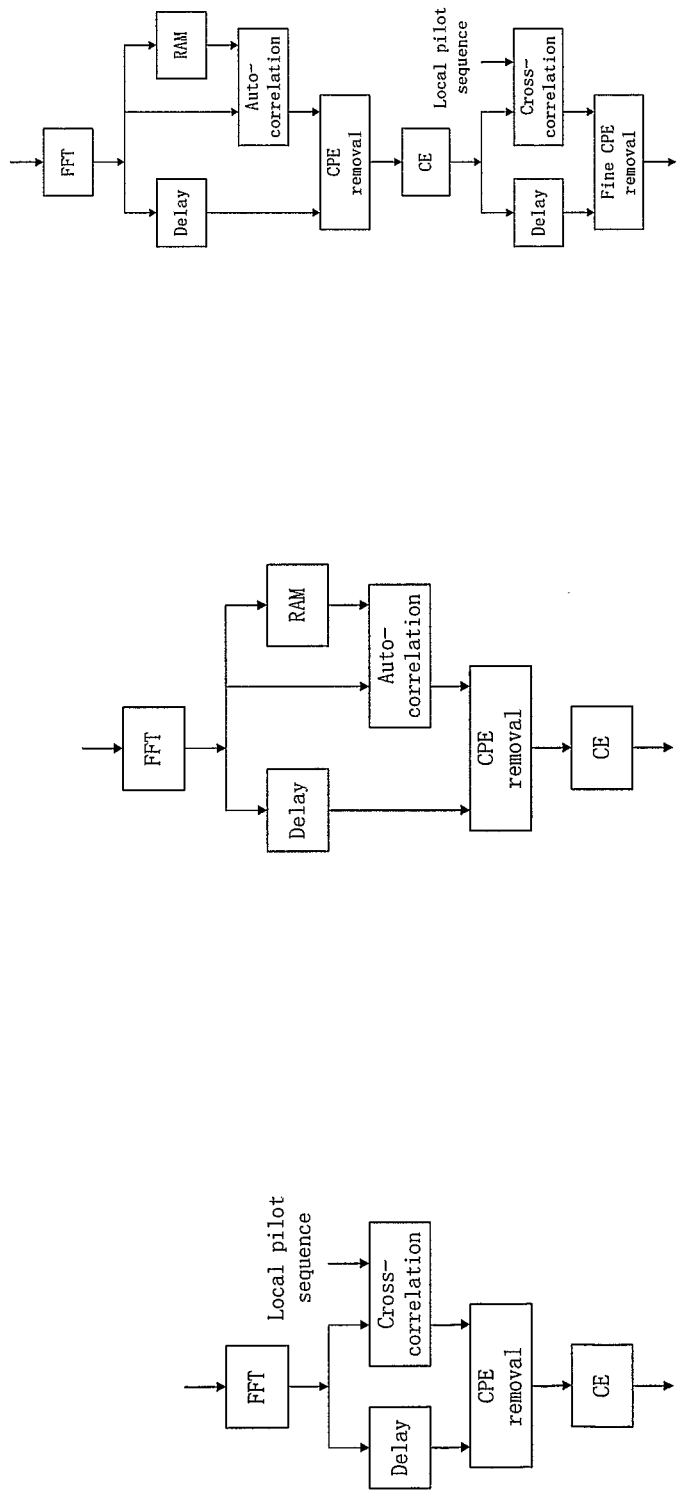
FIGS. 2A-2C are schematic diagrams illustrating three types of CPE removal method in the conventional OFDM digital signal reception apparatus.
Figure 3:
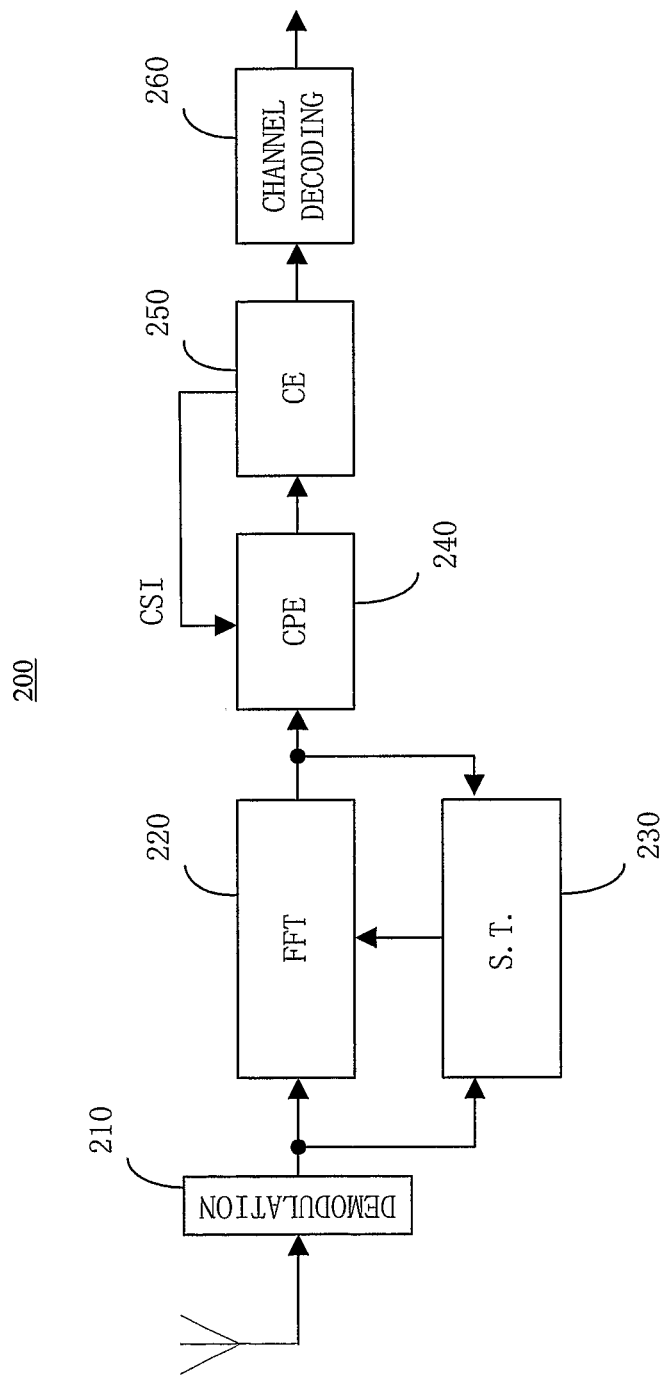
FIG. 3 is a block diagram illustrating an OFDM digital signal reception apparatus in accordance with the present invention.

The present invention provides an OFDM digital signal reception apparatus which employs an improved CPE (common phase error) removal method. As illustrated in FIG. 3, a digital signal reception apparatus 200, particularly an OFDM digital signal receiver is provided in accordance with one embodiment of the present invention. Similar to the conventional OFDM digital signal receiver as shown in FIG. 1, the general configuration of the OFDM digital signal receiver of the invention comprises a demodulation module 210, a FFT module 220, a synchronization and timing module 230, a CPE removal module 240, a channel estimation (CE) module 250, and a channel decoding module 260, characterized in that a feed back loop is provided from the CE module 250 to the CPE removal module 240.

Figure 4:
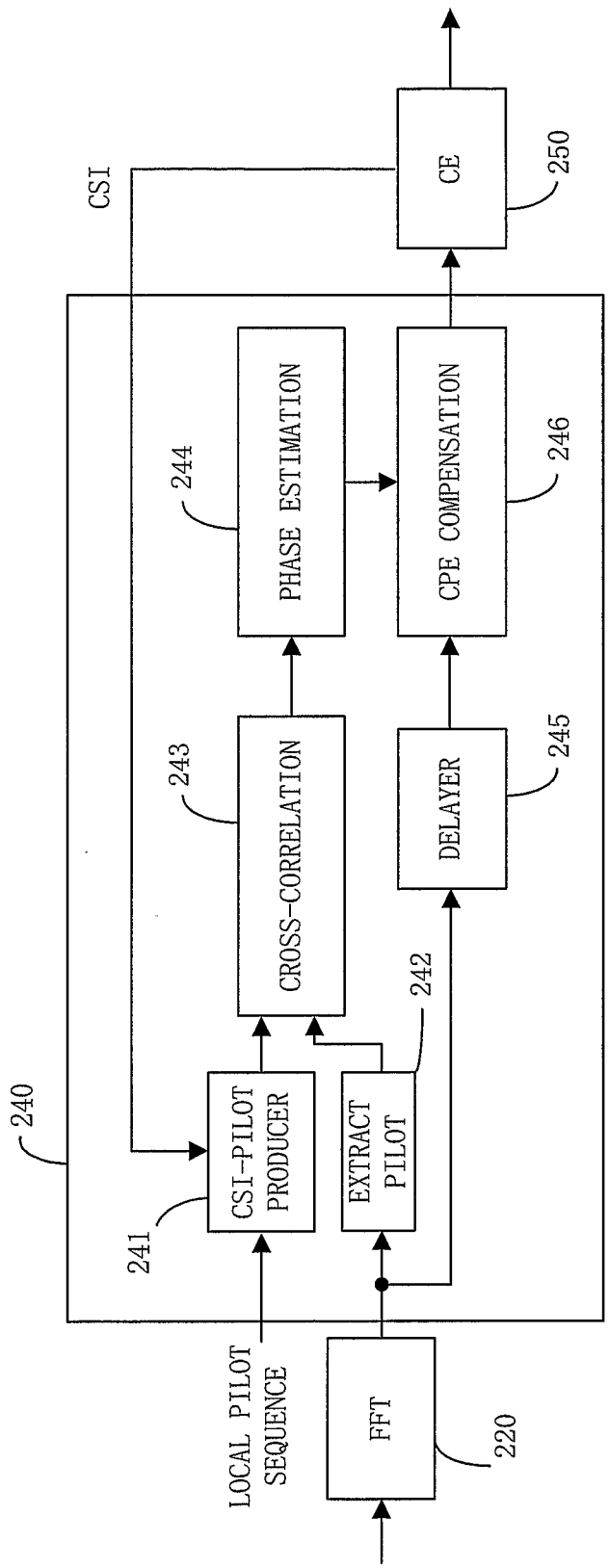
FIG. 4 is a block diagram illustrating a CPE removal module of the OFDM digital signal reception apparatus in accordance with the present invention.

As illustrated in FIG. 4, the CPE removal module 240 of the OFDM digital signal receiver 200 includes a CSI-pilot producer unit 241, a pilot extraction unit 242, a cross-correlation unit 243, a phase estimation unit 244, a delayer unit 245, and a CPE compensation unit 246. The CSI-pilot producer unit 241 is to correct the local pilot sub-carriers with the feedback CSI from the CE module 250, the algorithm for generating the CSI corrected pilot sub-carriers will be explained later in next paragraph. The pilot extraction unit 242 is used to extract the pilots in OFDM symbols of the received signal and give flags at the pilot locations. For example, there are forty five continual pilots (CPs) signals contained in each symbol in the DVB-T standard for 2K mode. The cross-correlation unit 243 includes a first part of complex multiplication between the local CSI-pilots and extracted pilots, and a second part of making a sum of the multiplication results in one symbol, thereby generates a cross correlation result between the local CSI-pilot sub-carriers and the extracted pilot sub-carriers. Afterwards, the phase estimation unit 244 calculates an arctangent value e of the cross correlation results, i.e. the phase angle caused by CPE, and then converts it into complex numbers which includes a real number component (I=cos θ) and an imaginary number component (Q=sin θ). In the delayer unit 245, the received OFDM digital signal is delayed by one symbol, and the outputs are fed to the CPE compensation unit 246. Finally, the CPE compensation unit 246 multiplies the one-symbol-delayed signal with the results of phase estimation unit 244 so as to eliminate the CPE contained in the received signals.

Figure 5:
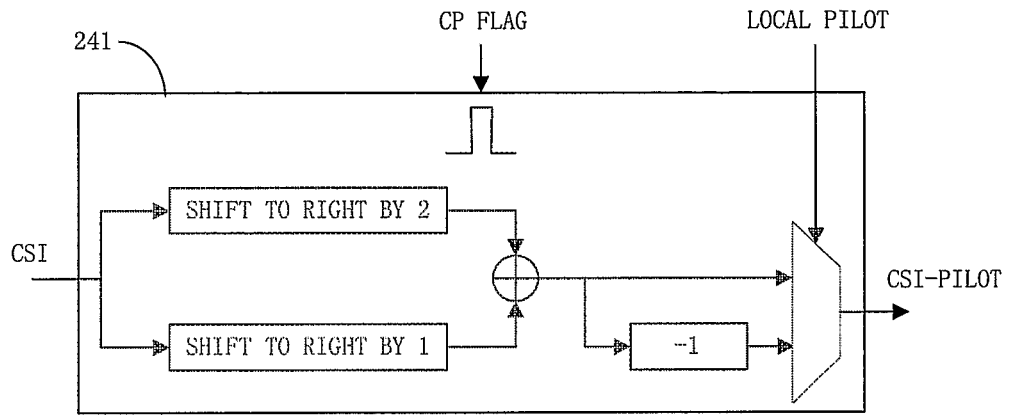
FIG. 5 is a block diagram illustrating the CSI-pilot producer of the CPE removal module of the OFDM digital signal reception apparatus in accordance with the present invention.

As illustrated in FIG. 5, according to one embodiment of the CSI-pilot producer unit 241 of the present invention, the CSI-pilot generation operation is only enabled by the continual pilots (CPs). In response to the CP flag of the received signal, the CSI from CE unit 250 is first multiplied with ¾, and then selectively multiplies 1 or −1 according to positive or negative sign of the local pilot sub-carriers, thereby the local pilot sub-carriers are corrected by the CSI and new CSI-pilot sub-carriers are generated. As shown in FIG. 5, the meaning of "shift to right by 2" is that the CSI is divided by 2^2, and the meaning of "shift to right by 1" is that the CSI is divided by 2^1. Next, the results are added which means that the CSI introduced is multiplied with ¾. Other implementation for multiplying the CSI with ¾ may also applicable. Accordingly, the output of the CSI-pilot producer unit 241 is a new pilot sub-carriers corrected by CSI, which means a local pilot sub-carries reflecting the CSI.

Figure 6:
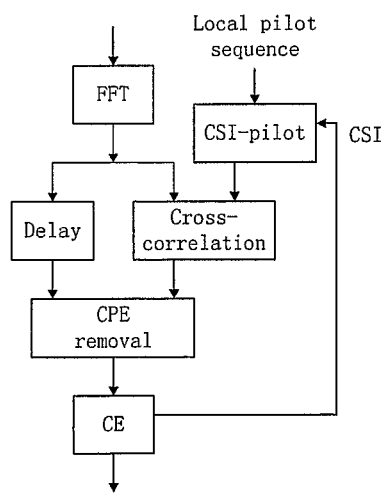
FIG. 6 is a schematic diagram illustrating the CPE removal method in accordance with the present invention.
Figure 7:
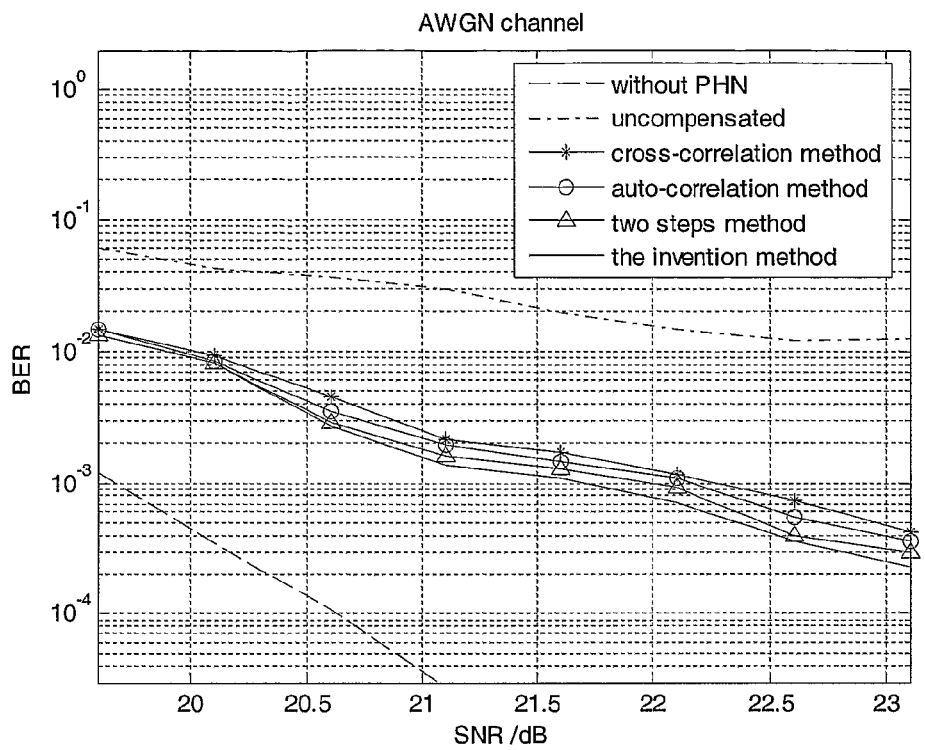
FIG. 7 to FIG. 11 show simulation experiments results of the present invention with different channel models used therein.
Figure 8:
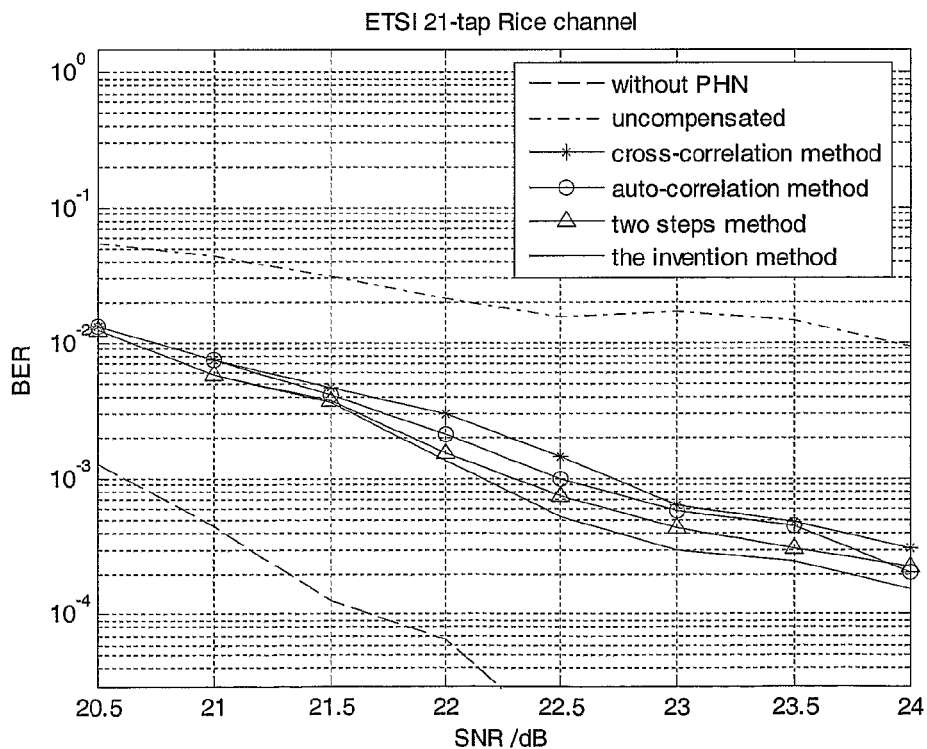
Figure 9:
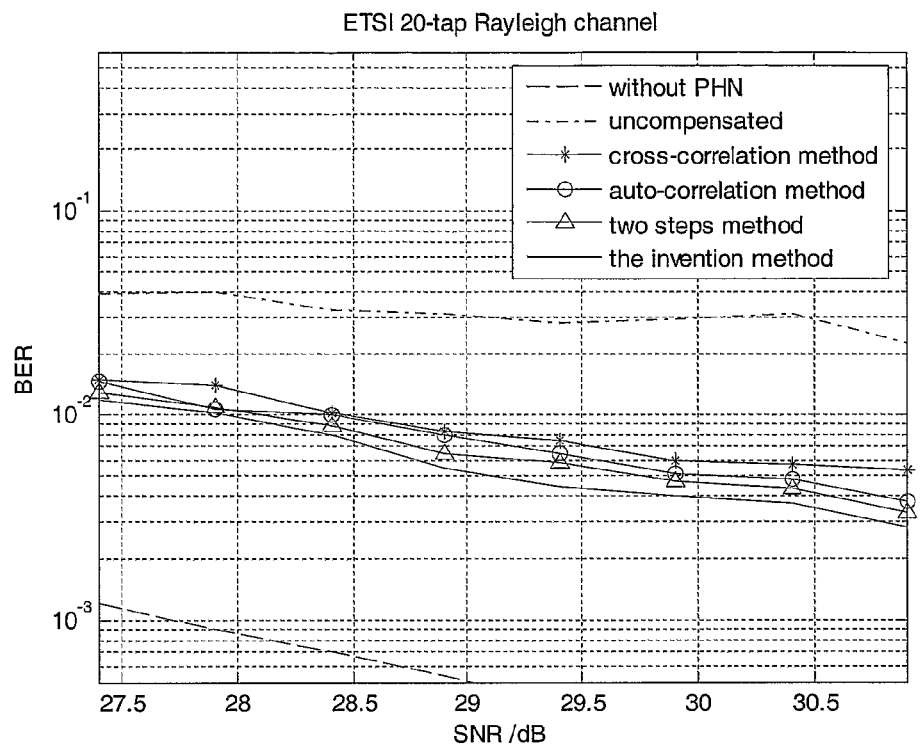
Figure 10:
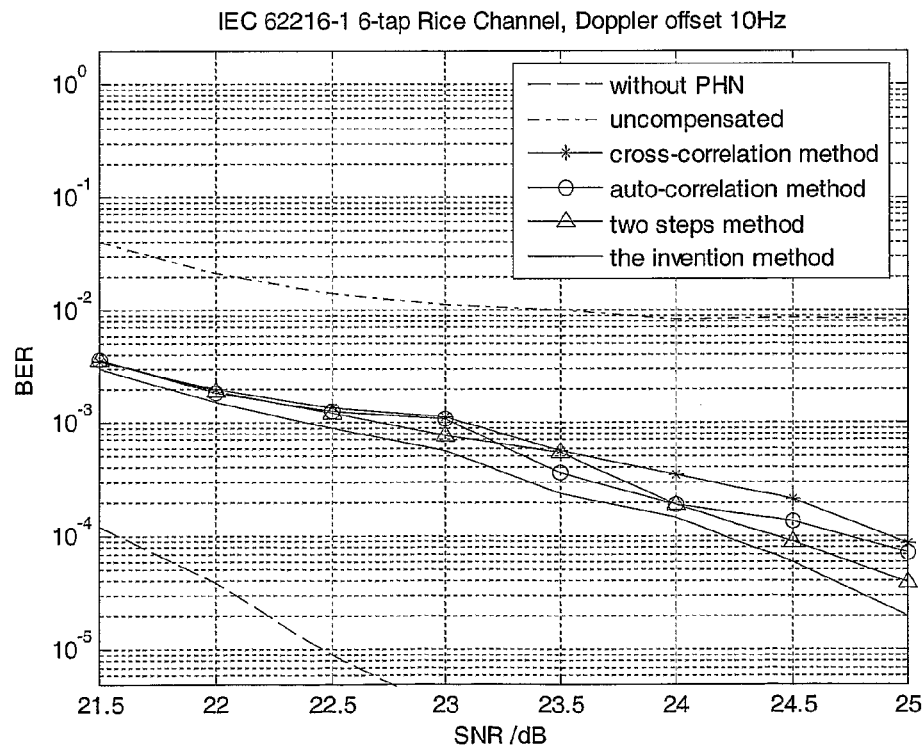
Figure 11:
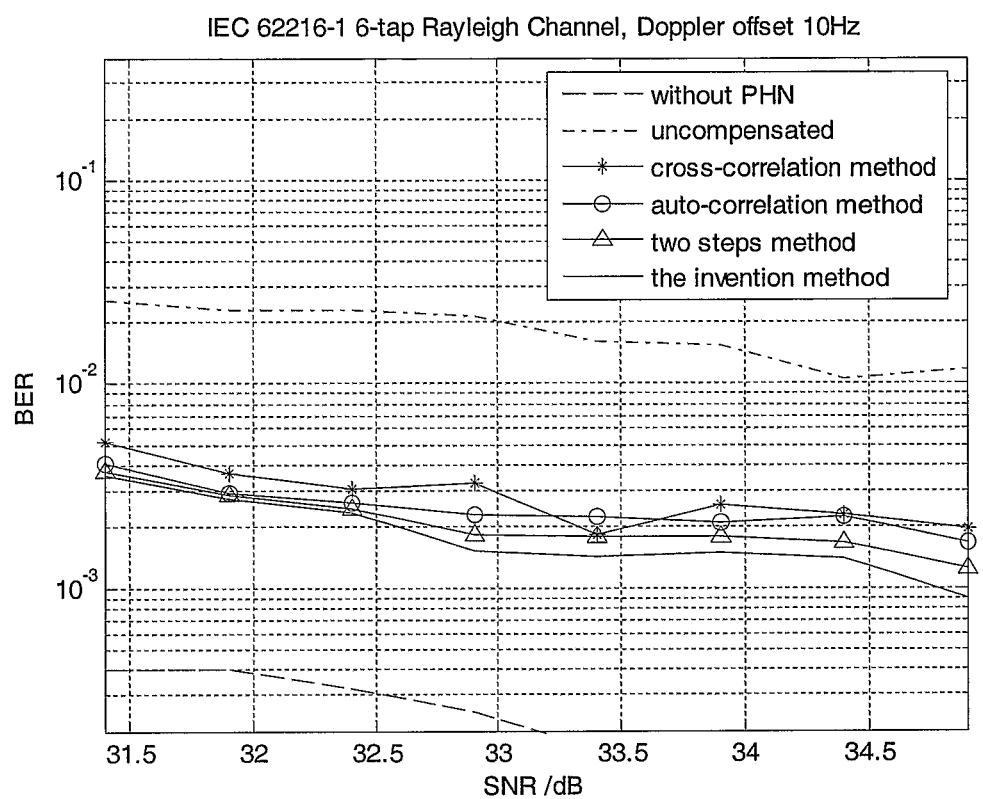

4. FIG. 6 is a simplified block diagram illustrating the CPE removal method used in the OFDM digital signal reception apparatus in accordance with the present invention. The invention introduces the CSI (Channel State Information) into the CPE estimation. As seen obviously in FIG. 6, it still uses a simple cross-correlation CPE removal method, which decides its low implementation complexity. The difference between the inventive method and the conventional cross-correlation CPE removal method is that the local pilot sub-carriers is corrected by the CSI come from the CE, and a new pilot sub-carriers (CSI-pilot) which can reflect the channel response is used in the cross correlation operation. According to an embodiment of the invention, the CPE removal method comprises steps of estimating channel state information (CSI) of the digital signal received after removing Common Phase Error (CPE); generating the CSI corrected pilot sub-carriers by multiplying the CSI with 1 or −1 according to positive or negative sign of the local pilot sub-carriers only in response to continual pilots of the received signal; and eliminating the CPE of the received signal by using a pilot sub-carriers that is corrected from a local pilot sub-carriers with the CSI generated in the previous step. The digital signal reception method of the invention further comprises extracting pilots of the received signal and give flags for the pilot's locations, then correlating the extracted pilot sub-carriers of the received signal with the CSI corrected pilot sub-carriers; and finally eliminating the CPE contained in the received signal by multiplying estimated phase angel of the correlation result with the received signal delayed by one symbol.

Thus the channel effects and phase error of the CE can all be removed during the CPE removal and accurate correlation results can be obtained.

$$\hat{\varphi} = \arg(P_k e^{j\varphi_i(k)} \cdot H_i(k) \cdot (P_k \cdot \hat{H}_i(k))^*) \quad (9)$$
$$= \varphi_i(k) + \arg(H_i(k) \cdot \hat{H}_i^*(k))$$
$$= \varphi_i(k) + \varphi_H(k) - \hat{\varphi}_H(k)$$

After CPE removal, we can obtain:

$$\hat{Y}_i(k) = Y_i(k) \cdot e^{-j\hat{\varphi}} \quad (10)$$
$$= X_i(k) e^{j\varphi_i(k)} \cdot H_i(k) \cdot e^{-j\hat{\varphi}} + \mu_i(k)$$
$$= X_i(k) e^{j\varphi_i(k)} \cdot e^{j\varphi_H(k)} \cdot e^{-j(\varphi_i(k)+\varphi_H(k)-\hat{\varphi}_H(k))} + \mu_i(k)$$
$$= X_i(k) \cdot e^{j\hat{\varphi}_H} + \mu_I(k)$$

After CE, we can obtain:

$$\hat{X}_i(k) = \hat{Y}_i(k) \cdot \hat{H}_i^*(k) \quad (11)$$
$$= (X_i(k) \cdot e^{j\hat{\varphi}_H} + \mu_i(k)) \cdot \hat{H}_i^*(k)$$
$$= (X_i(k) \cdot e^{j\hat{\varphi}_H} + \mu_i(k)) \cdot e^{-j\hat{\varphi}_H}$$
$$= X_i(k) + \mu_i(k)$$

Then, a variety of simulation experiments are made to assess the performance of the present invention, the conditions are set with reference to the Table 1 as follows.

TABLE 1

| Conditions of simulations | |
| --- | --- |
| Model | Parameter |
| Signal model | DVB-T OFDM signal<br>2k mode<br>Non-hierarchical<br>64QAM, 1/4 Guard interval, 7/8 Code rate<br>2 Superframe |
| Channel model | AWGN channel<br>ETSI 21-tap Rice channel<br>ETSI 20-tap Rayleigh channel<br>IEC 62216-1 6-tap Rice Channel, Doppler offset 10 Hz<br>IEC 62216-1 6-tap Rayleigh Channel, Doppler offset 10 Hz |
| PHN model | −60 dBc/Hz −> 1.5 kHz, −200 dBc/Hz −> 200 kHz |

The respective experiment results for difference channel models can be shown through FIG. 7 to FIG. 11. From those simulation results, we can find that the invention method has a better performance in comparison with those conventional methods.

Secondly, the method of the present invention is compared with these conventional methods for their complexity, which is very important to the implementation, the lower complexity means lower power consumption and lower cost. Since the pre-CE methods are not comparable for their accuracy and performance, we only consider the two-step method in the complexity comparison. For the two steps method and the invention, the invention method includes one cross-correlation and one multiplication of complex numbers that is to produce CSI-pilot. The two steps method consists of one auto-correlation and one cross-correlation. So the invention has much less complexity than the conventional two steps method, as shown in details in Table 2 as follows.

TABLE 2 resource comparison

| Resource Type | Resource Utilization | |
|---|---|---|
| | Two steps method | The invention |
| Delay FIFO | 2 | 1 |
| Pilot store RAM | 1 | 0 |
| Multiplication | 12 | 8 |
| Arctan | 2 | 1 |
| Rom_sincos | 4 | 2 |

It is apparent from the foregoing description that the invention is more accurate and much simpler than the conventional methods. Therefore a better performance is obtained and the cost is low.

The present invention is not limited to the above described embodiments, various variations and modifications may be possible without departing from the scope of the present invention.

The invention claimed is:

1. A digital signal receiver comprising:
    a Common Phase Error (CPE) removal unit (240) configured to reduce common phase error of the received signal by using pilot sub-carriers that are corrected from local pilot sub-carriers with channel state information (CSI); and
    a channel estimation (CE) unit (250) configured to estimate the channel state information (CSI) of the received signal after reducing common phase error (CPE) and feed the CSI back to the CPE removal unit (240);
    wherein, the CPE removal unit (240) comprises a means (241) for generating the CSI corrected pilot sub-carriers by multiplying the CSI received from the CE unit (250) with 1 or −1 according to positive or negative sign of the local pilot sub-carriers only in response to continual pilots of the received signal.

2. The digital signal receiver as claimed in claim 1, characterized in that the CPE removal unit (240) further comprises:
    a means (243) for correlating extracted pilot sub-carriers of the received signal with the CSI corrected pilot sub-carriers, and
    a means (246) for reducing the CPE contained in the received signal by multiplying estimated phase angel of the correlation result with the received signal delayed by one symbol.

3. A digital signal reception method comprising:
    estimating channel state information (CSI) of the digital signal received after removing Common Phase Error (CPE); and
    reducing the CPE of the received signal by using CSI corrected pilot sub-carriers that are generated by multiplying the CSI generated in the previous step with 1 or −1 according to positive or negative sign of the local pilot sub-carriers only in response to continual pilots of the received signal.

4. The method as claimed in claim 3, characterized in that it further comprises
    correlating extracted pilot sub-carriers of the received signal with the CSI corrected pilot sub-carriers; and
    reducing the CPE contained in the received signal by multiplying estimated phase angel of the correlation result with the received signal delayed by one symbol.

* * * * *